United States Patent [19]

Perez

[11] Patent Number: 4,640,260

[45] Date of Patent: Feb. 3, 1987

[54] ADJUSTABLE FLEXIBLE DUAL GAS MIXING ASSEMBLY

[76] Inventor: Manuel Perez, 11204 Hidden Valley, Tampa, Fla. 33624

[21] Appl. No.: 821,046

[22] Filed: Jan. 22, 1986

[51] Int. Cl.[4] ............................................. F24C 3/00
[52] U.S. Cl. .................................. 126/39 E; 126/41 R; 431/354
[58] Field of Search ................ 126/39 R, 39 E, 41 R; 431/354

[56] References Cited

U.S. PATENT DOCUMENTS

| 4,373,505 | 2/1983 | Koziol | 126/39 E |
| 4,485,799 | 12/1984 | Perez | 126/39 E |
| 4,488,534 | 12/1984 | Koziol | 126/41 R X |
| 4,586,483 | 5/1986 | Perez | 126/41 R |

FOREIGN PATENT DOCUMENTS 2524492 12/1976 Fed. Rep. of Germany .... 126/39 R

Primary Examiner—Margaret A. Focarino
Attorney, Agent, or Firm—Arthur W. Fisher, III

[57] ABSTRACT

An adjustable dual gas mixing assembly specifically configured for use with a dual burner gas grill including a burner element having at least one pair of gas supply ports formed therein, the adjustable dual gas mixing assembly comprising a pair of flexible gas supply tubes disposed in spaced relationship relative to each other secured to the burner element in open fluid communications with the gas supply ports and a corresponding pair of rigid mixing tubes rotatably disposed within the corresponding flexible gas supply tube, each flexible gas supply tube including a corresponding mounting plate formed thereon to secure each flexible gas supply tube to the burner element and each rigid mixing tube including an annular flange formed on the inner end thereof and at least one air aperture formed on the outer portion thereof such that each flexible gas supply tubes may be deflected laterally and each rigid mixing tubes may be adjusted longitudinally relative to the corresponding flexible gas supply tube.

6 Claims, 6 Drawing Figures

U.S. Patent  Feb. 3, 1987  4,640,260
FIG. 1
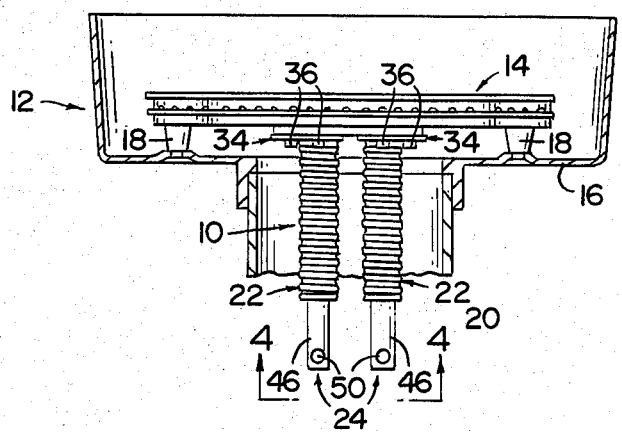
FIG. 2
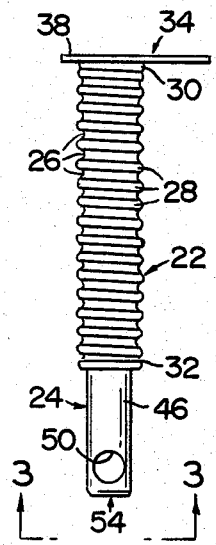
FIG. 3
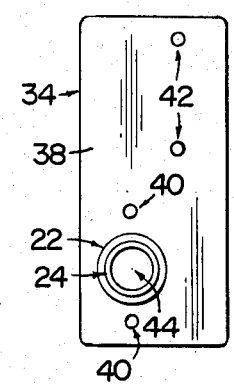
FIG. 4
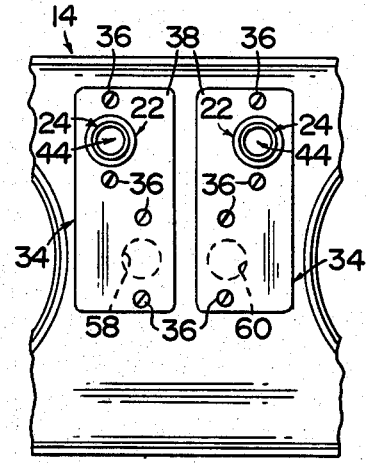
FIG. 5
FIG. 6
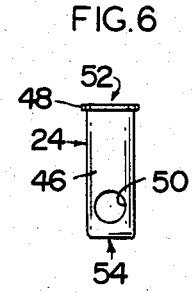

ADJUSTABLE FLEXIBLE DUAL GAS MIXING ASSEMBLY

BACKGROUND OF THE INVENTION

1. Field of the Invention

An adjustable dual gas mixing assembly specifically configured for use with a dual burner gas grill including a burner element, the adjustable dual gas mixing assembly comprising a pair of flexible gas supply tubes affixed to the burner element and a corresponding rigid mixing tube rotatably disposed within each flexible gas supply tube.

2. Description of the Prior Art

A number of different designs and configurations for gas grils have been developed. Gas grills are often arranged to uniformally heat over the entire area of the grill enclosure. This is desirable when each piece of food or all portions of a large portion of food will receive an equal amount of heat rendering it unnecessary to shift the pieces or piece during cooking. Unfortunately in larger grills, there may be a need to operate different areas on the grill at different temperatures. To accomplish this, various split or dual gas burners have been developed. Such grills include a pair of gas supply tubes in spaced relation relative to a corresponding pair of gas supply nozzles. The longitudinal separation between the gas supply tubes and gas supply nozzles may vary from 4 to 7 inches between grills while the lateral separation between the pair of gas supply nozzles may vary from 1¼ to 3 inches. Moreover, the positioning of the pair of gas supply nozzles relative to the burner itself may vary. Examples of such prior art are disclosed in U.S. Pat. No. 3,638,635 and U.S. Pat. No. 4,092,975.

In addition, various attempts have been undertaken to provide a universal burner element for gas grills to accommodate gas grills of various sizes. In order to provide this, such structures have included adjustable and telescoping gas intake/venturi tube assemblies for the gas grill. An example of such prior art is disclosed in U.S. Pat. No. 4,267,816.

U.S. Pat. No. 4,488,534 shows a dual adjustable gas intake assembly for a barbecue grill for use with various types of gas barbecue grill burners. A venturi tube and a supply tube are connected by a flexible section permitly horizontal and vertical adjustment of the supply tube.

U.S. Pat. No. 4,478,205 discloses a dual adjustable gas intake assembly for a barbecue grill which can be utilized with various types of gas barbecue grill burners. A venturi tube and an intermediate supply tube telescope together as does an intermediate supply tube and an gas intake member of the burner. Adjustable securing mean is provided between the intermediate supply tube, the gas intake member and the vent tube. The dual adjustable intake assembly affords both horizontal and vertical adjustment between the gas supply and the burner.

Additional examples of prior art are shown in U.S. Pat. No. 4,356,810, 4,373,505 and 4,485,799.

Unfortunately when combining a dual or split burner with an adjustable gas intake tube/venturi assembly there is a substantial danger or hazard in not having each of the dual gas intake/venturi assemblies properly seated on the dual gas supply nozzles. Thus there is a significant need for maintaining the dual gas intake/venturi assemblies in proper alignment relative to each other.

SUMMARY OF THE INVENTION

The present invention relates to an adjustable dual mixing assembly for use with a dual burner gas grill including a burner element.

The adjustable dual mixing assembly comprises a pair of adjustable gas burner mixing supply assemblies each including an upper flexible gas supply tube and a corresponding lower rigid mixing tube rotatably disposed therein.

Each upper flexible gas supply tube comprises a continuous, uninterrupted spiral configured trough or groove and ridge. Each upper flexible gas supply tube includes a mounting member comprising a substantially rectangular flat mounting plate having a first and second pair of mounting apertures formed on opposite end portions thereof and on opposite sides of the geometric longitudinal center line thereof to secure each upper flexible gas supply tube to the burner element. An offset gas outlet port is formed in the substantially rectangular flat mounting plate in open fluid communication with the interior of the upper flexible gas supply tube and lower rigid mixing tube.

Each lower rigid mixing tube comprises a hollow substantially cylindrical member having an inner annular mounting flange and at least one air feed aperture formed on opposite end portions thereof. The inner annular mounting flange 48 has a diameter greater than the diameter of the continuous, uninterrupted spiral configured trough and less than the diameter of the continuous, uninterruped spiral configured ridge to be rotatably retained within the corresponding upper flexible gas supply tube. An air/gas outlet port and gas inlet port are formed on opposite ends of the hollow substantially cylindrical member. When in use, the gas inlet port is disposed relative to a gas supply nozzle to receive gas therefrom.

The telescoping relationship between each upper flexible gas supply tube and the corresponding lower rigid mixing tube by rotation of the corresponding lower rigid mixing tube permits adjustment for the various longitudinal or height separations between the burner element and the gas supply nozzle(s) from different manufacturers while the upper flexible gas supply tubes permit lateral adjustment of each individual adjustable gas burner mixing supply assembly relative to the corresponding gas supply nozzle by bending each of the individual upper flexible gas supply tubes to accomodate variations in the lateral separation of the gas supply nozzles.

In use, each adjustable gas burner mixing supply assembly may be affixed to the burner element in a first or second position by the fasteners extending through the first and second pair of mounting apertures in order that each adjustable gas burner mixing supply assembly may be adjusted to longitudinally and laterally fit over the corresponding gas supply mozzle(s) to permit fluid communication between the gas source and the burner element.

The burner element includes a first and second pair of gas supply ports. When in the first position, the adjustable gas burner mixing supply assemblies affixed to the burner element, the substantially rectangular flat mounting plates close the second pair of gas supply ports while offset gas outlet ports are in registry with the first pair of gas supply ports to permit gas and air to be fed through the gas inlet port and air feed aperture to the burner element. When in the second position, the substantially rectangular flat mounting plates close the first pair of gas supply ports while the offset gas outlet ports are in registry with the second pair of gas supply ports to permit gas and air to be fed through the gas inlet port and air feed aperture to the burner element.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a side view of an adjustable dual gas mixing assembly within a dual burner gas grill.

FIG. 2 is a side view of a flexible gas supply tube and corresponding rigid mixing tube.

FIG. 3 is a bottom view of the flexible gas supply tube and corresponding rigid mixing tube.

FIG. 4 is a bottom view of the adjustable dual gas mixing assembly mounted in a first position.

FIG. 5 is a bottom view of the adjustable dual gas mixing assembly mounted, in a second position.

FIG. 6 is a detailed side view of the rigid mixing tube.

Similar reference characters refer to similar parts throughout the several views of the drawings.

DETAILED DESCRIPTION OF THE PREFERRED EMBODIMENT

As shown in FIG. 1, the present invention relates to an adjustable dual mixing assembly generally indicated as 10 for use with a dual burner gas grill generally shown in part as 12. The dual burner gas grill 12 comprises a burner element generally indicated as 14 supported in spaced relation relative to the floor 16 by a plurality of support members each indicated as 18.

As shown in FIG. 1, the adjustable dual mixing assembly 10 comprises a pair of adjustable gas burner mixing supply assemblies each generally indicated as 20. As shown in FIGS. 1 and 2, each adjustable gas burner mixing supply assembly 20 comprises an upper flexible gas supply tube generally indicated as 22 and a corresponding lower rigid mixing tube generally indicated as 24 rotatably disposed therein.

As shown in FIGS. 1 and 2, each upper flexible gas supply tube 22 comprises a continuous, uninterrupted spiral configured trough or groove and ridge indicated as 26 and 28 respectively extending from the origin 30 to terminus 32 thereof. Each upper flexible gas supply tube 22 includes a mounting member generally indicated as 34 formed at the origin 30 to secure each upper flexible gas supply tube 22 to the burner element 14 with fasteners 36. As shown in FIGS. 3 through 5, each mounting member 34 comprises a substantially rectangular flat mounting plate 38 having a first and second pair of mounting apertures indicated as 40 and 42 respectively formed on opposite end portions thereof and on opposite sides of the geometric longitudinal center line thereof. An offset gas outlet port 44 is formed in the substantially rectangular flat mounting plate 38 in open fluid communication with the interior the upper flexible gas supply tube 22 and lower rigid mixing tube 24.

As shown in FIGS. 1, 2 and 6, each lower rigid mixing tube 24 comprises a hollow substantially cylindrical member 46 having an inner annular mounting flange 48 and at least one air feed aperture 50 formed on opposite end portions thereof. The inner annular mounting flange 48 has a diameter greater than the diameter of the continuous, uninterrupted spiral configured trough 26 and less than the diameter of the continuous, uninterrupted spiral configured ridge 28 to be rotatably retained within the corresponding upper flexible gas supply tube 22. An air/gas outlet port and gas inlet port indicated as 52 and 54 respectively are formed on opposite ends of the hollow substantially cylindrical member 46. When in use, the gas inlet port 54 is disposed relative to a gas supply nozzle (not shown) to receive gas therefrom.

The telescoping relationship between each upper flexible gas supply tube 22 and the corresponding lower rigid mixing tube 24 by rotation of the corresponding lower rigid mixing tube 24 permits adjustment for the various longitudinal or height separations between the burner element 14 and the gas supply nozzle(s) (not shown) from different manufacturers while the upper flexible gas supply tubes 22 permit lateral adjustment of each individual adjustable gas burner mixing supply assembly 20 relative to the corresponding gas supply nozzle (not shown) by bending each of the individual upper flexible gas supply tubes 22 to accommodate variations in the lateral separation of the gas supply nozzles (not shown).

The dual burner gas grill 12 may comprise an in-post control or an up-front control. The operation of the adjustable dual mixing assembly 10 is best understood with reference to FIGS. 4 and 5. Specifically, each adjustable gas burner mixing supply assembly 20 may be affixed to the burner element 14 in a first position (FIG. 4) or a second position (FIG. 5) by the fasteners 36 extending through the first and second pair of mounting apertures 40 and 42 respectively in order that each adjustable gas burner mixing supply assembly 20 may be adjusted to longitudinally and laterally fit over the corresponding gas supply nozzle(s) (not shown) to permit fluid communication between the gas source (not shown) and the burner element 14.

As depicted, the burner element 14 includes a first pair of gas supply ports each indicated as 56 and a second pair of gas supply ports each indicated as 58. The phantom lines 60 in FIG. 5 show a lateral disposition of the gas supply ports 58 relative to each other of 1½ inches separation while the phantom lines 62 in FIG. 4 show the gas supply ports 58 with 4 inches lateral separation. When in the first position as shown in FIG. 4 with the adjustable gas burner mixing supply assemblies 20 affixed to the burner element 14, the substantialy rectangular flat mounting plates 38 close the second pair of gas supply ports 58 while offset gas outlet ports 44 are in registry with the first pair of gas supply ports 56 to permit gas and air to be fed through the gas inlet port 54 and air feed aperture 50 respectively to the burner element 14. When in the second position as shown in FIG. 5, the substantially rectangular flat mounting plates 38 close the first pair of gas supply ports 58 while the offset gas outlet ports 44 are in registry with the second pair of gas supply ports 56 to permit gas and air to be fed through the gas inlet port 54 and air feed aperture 50 respectively to the burner element 14.

It will thus be seen that the objects set forth above, and those made apparent from the preceding description are efficiently attained and since certain changes may be made in the above construction without departing from the scope of the invention, it is intended that all matter contained in the above description or shown in the accompanying drawings shall be interpreted as illustrative and not in limiting sense.

It is also to be understood that the following claims are intended to cover all of the generic and specific features of the invention herein described, and all statements of the scope of the invention which as a matter of language, might be said to fall therebetween.

Now that the invention has been described,

What is claimed is:

1. An adjustable gas mixing assembly specifically configured for use with a burner gas grill including a burner element having a first and second gas supply port formed therein, said adjustable gas mixing assembly comprising a flexible gas supply tube secured to the burner element in open fluid communication with the first or second gas supply port and a corresponding rigid mixing tube rotatably disposed within said flexible gas supply tube, said flexible gas supply tube including a mounting member including a substantially rectangular flat mounting plate having a first pair of mounting apertures formed thereon and an offset gas outlet port in open fluid communication with the interior of said flexible gas supply tube and said lower rigid mixing tube mounting member configured to secure said flexible gas supply tube to the burner element, said rigid mixing tube including an annular flange formed on the inner end thereof and at least one air aperture and a gas inlet port formed on the outer portion thereof such that said flexible gas supply tube may be deflected laterally and said rigid mixing tube may by adjusted longitudinally relative to said flexible gas supply tube, the first and second gas supply ports being offset relative to each other with respect to the lateral center line of the burner element such that said substantially rectangular flat mounting plate will close the first gas supply port when in a first position and the second gas supply port when in a second position.

2. The adjustable gas mixing assembly of claim 1 wherein said upper flexible gas supply tube comprises an uninterrupted spiral configured trough and groove ridge.

3. The adjustable gas mixing assembly of claim 2 wherein said uninterrupted spiral configured trough and ridge extends substantially the length of said upper flexible gas supply tube.

4. The adjustable gas mixing assembly of claim 2 wherein said lower rigid mixing tube comprises a hollow substantially cylindrical member having an inner annular mounting flange formed on one end thereof.

5. The adjustable gas mixing assembly of claim 4 wherein the diameter of said inner annular mounting flange is greater than the diameter of said uninterruped spiral configured trough and less than the diameter of said uninterrupted spiral configured ridge to be rotatably retained within said upper flexible gas supply tube.

6. The adjustable gas mixing assembly of claim 1 wherein the burner element includes a first pair of gas supply ports and a second pair of gas supply ports and said adjustable gas mixing assembly includes a pair of flexible gas supply tube and a corresponding pair of rigid mixing tubes such that said substantially rectangular flat mounting plates will close the first pair of gas supply ports when in said first position and the second pair of gas ports when in said second position.

* * * * *